3,404,140
SHAPED ARTICLE OF POLYOLEFIN COMPOSITION HAVING IMPROVED DYEABILITY CONTAINING METAL COMPOUNDS AND A PROCESS FOR DYEING THE SAME
Osamu Fukumoto and Masayoshi Kubo, Ohtsu-shi, and Tsutomu Kamijo, Higashiyama-ku, Kyoto, Japan, assignors to Toyo Rayon Kabushiki Kaisha, Tokyo, Japan, a corporation of Japan
No Drawing. Filed Sept. 9, 1964, Ser. No. 395,181
Claims priority, application Japan, Sept. 30, 1963, 38/52,951, 38/52,952; Oct. 25, 1963, 38/57,086; Feb. 27, 1964, 39/10,609
14 Claims. (Cl. 260—93.7)

ABSTRACT OF THE DISCLOSURE

A shaped polyolefin article having improved dyeability and a method for producing the same wherein said article comprises a polyolefin containing
(1) at least one organic metal salt of (a) a metal from Groups Ib, IIb, IVb, and VIII of the fourth period of the Periodic Table and (b) a carboxyl radical-containing compound, and
(2) at least one phosphoric acid ester.

---

This invention relates to a shaped article of polyolefin composition having improved dyeability containing metal compounds and a process for dyeing the same, More particularly, this invention relates to a shaped article of polyolefin composition of fiber, etc., which can be dyed very brilliantly with dyes capable of forming a chelate compound with metals contained therein and a process for dyeing the same.

Polyolefin has excellent physical and chemical properties, but essentially lacks dye-affinity. Therefore, it is very difficult to dye the same by an ordinary dyeing process, for instance, even if the same is dyed by dissolving a coloring matter in a state of solid solution in polyolefin by the use of an oil-soluble dye, no satisfactory fastness of color is obtainable.

In order to improve such dyeability of polyolefin, various researches for improvement have hitherto been conducted, of which processes for dyeing polyolefin comprising adding to polyolefin a certain metal compound such as, for instance, zinc and nickel compound, shaping the mixture thereafter dyeing the mixture with a dye capable of being dyed through forming a specific chelate compound with said metal compound have been proposed in Japanese patent application publication No. 4,477/1963, U.S. Patent 2,984,634, Japanese patent application publication No. 15,466/1962 as well as Belgian Patents 617,280, 614,776, 632,653 and 632,652.

As metal compounds preferably usable in these processes, there are transition metals of IIb, IVa, VIa, VIIa groups or 4th period of VIII group of the Periodic Table, or organic salts or complex salts of metals of IIa or IVb group. These metal compounds melt-mixed inside polyolefin bond specific dyes capable of forming a chelate compound with metals, being dyed in a relatively deep color tone.

Whereas, it is extremely difficult to uniformly dissolve and disperse such polar organic metal compounds in a strongly hydrophobic polymer like polyolefin, for this reason upon dyeing by utilizing the chelate compound with such metals there is a fatal shortcoming that the color is substantially darkened to a remarkable extent, and it is by no means possible to obtain a brilliant dyed product as compared with the case of the conventional other fibers.

In addition, when polyolefin containing such organic metal compounds is heated to high temperatures at the time of melt-shaping and subjected to dry and wet heat treatments prior to being dyed with said dyes, it loses its dye-acceptability and dyeability, and the dyed color tone becomes very dull, as a result the obtained polyolefin shaped article has poor commercial value although it retains slight dyeability.

This trend is especially remarkable when polyolefin is added and mixed with carboxylates of said metals.

The reasons for these phenomena are considered to be attributable (1) the fact the organic metal compounds contained in polyolefin easily decompose when heated, changing into sulfides, etc. by combining with oxides, carbonates or stabilizers, as a result the dyeability changes, (2) the fact the polar organic metal compounds would not uniformly dissolve or disperse in the polyolefin substrate which is strongly hydrophobic, and (3) the poor transmission and diffusion to these polyolefin substrates of the dye molecules resulted in the lack of accessibility to the organic metal compounds which become the dye bonding group.

The object of this invention is to provide a material capable of improving the dyeability and imparting brilliant color upon dyeing a polyolefin shaped article.

Another object of this invention is to provide a process for dyeing a shaped article of such polyolefin composition in brilliant colors.

That is, a shaped article of polyolefin composition having improved dyeability containing metal compounds according to this invention is charatcerized by:

That polyolefin is added with (1) at least one organic metal salt comprising (a) a metal selected from the group consisting of metals of Ib, IIb, IVb groups and VIII group of 4th period of the Periodic Table, and (b) a compound containing carboxyl radical, and (2) at least one kind of phosphoric ester compound (ester compound of phosphoric acid) represented by the formula

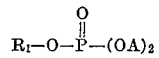

and

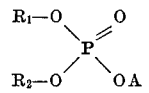

wherein $R_1$ and $R_2$ which can be the same or different, are radicals selected from the group consisting of saturated and unsaturated alkyl, aryl, alkylaryl, arylalkyl and cycloalkyl radicals, and A stands for an atom selected from the group consisting of hydrogen, aluminum, metals of VIII group of 4th period and II group.

And a process for dyeing polyolefin shaped article according to this invention is characterized in that a shaped article of said polyolefin composition is dyed with a dye which is water-insoluble and capable of forming a chelate compound with the metals of said organic metal salt.

The organic metal salt blended with polyolefin as a first component of the dye bonding group contains as its metal component a metal selected from the metals of Ib, IIb, IVb groups and VIII group of 4th period of the Periodic Table. As preferable metals of these metals, there may be cited copper, silver, zinc, cadmium, iron, cobalt and nickel. Of these, zinc and nickel are in particular preferable. Another component of the organic metal salt is a compound containing carboxyl radical. Said compound containing carboxyl radical as used in this invention has at least one carboxyl radical and can have other substituents. Thus, besides ordinary organic carboxylic acid, compounds such as, for instance, of oxy-acid, amino acid and keto acid are contained.

These metal salts have ordinarily ion-bonding properties, however, even when said metal salts are complex salts, they are naturally usable for the purpose of this invention. Also, it is possible to use the organic metal salts limited as aforesaid jointly with β-diketon or β-keto acid ester.

As such organic metal salts, an organic carboxylate, in particular a monocarboxylate is preferable. When the organic carboxylic acid constituting said carboxylate has not less than 8 carbon atoms, its effect is most excellent.

In ordinary cases, as such organic carboxylic acid, any one of aliphatic, alicyclic and aromatic carboxylic acids having 8–22 carbon atoms will do, however, aliphatic and alicyclic carboxylic acids are especially preferable. Further, ones having more than 22 carbon atoms are also usable and the effect of this invention is developed by their use.

As the organic metal salts limited as aforesaid of this invention, the following may be cited:

Monovalent saturated fatty acid salts such as zinc arachidate, zinc behenate, zinc cerotate, zinc stearate, zinc palmitate, zinc myristate, zinc laurate, zinc caprylate, zinc caproate, cadmium stearate, cadmium palmitate, cadmium myristate, cadmium laurate, cadmium capriate, cadmium caproate, copper stearate, copper palmitate, copper myristate, copper laurate, copper capriate, copper caprylate, tin stearate, tin palmitate, tin myristate, tin laurate, tin capriate, tin caproate, tin caprylate, nickel arachidate, nickel behenate, nickel cerotate, nickel stearate, nickel palmitate, nickel myristate, nickel laurate, nickel capriate, nickel caprylate, and nickel caproate;

Monovalent unsaturated fatty acid salts such as zinc oleate, zinc elaidate, cadmium oleate, cadmium elaidate, mercury oleate, cobalt elaidate, tin oleate, tin elaidate, iron oleate, and lead elaidate;

Divalent saturated fatty acid salt such as zinc malonate, zinc succinate, zinc glutarate, zinc adipate, zinc pimelate, zinc suberate, zinc azelate, zinc sebacate, nickel malonate, nickel succinate, nickel glutarate, nickel adipate, nickel pimelate, nickel suberate, nickel azelate, nickel sebacate, cobalt malonate, cobalt succinate, cobalt glutarate, cobalt adipate, cobalt pimelate, cobalt suberate, cobalt azelate, cobalt sebacate, tin malonate, tin succinate, tin glutarate, tin adipate, tin pimelate, tin suberate, tin azelate, copper malonate, copper succinate, copper glutarate, copper adipate, copper pimelate, copper suberate, copper azelate, and copper sebacate;

Divalent unsaturated fatty acid salt such as zinc maleate,, zinc fumarate, zinc crontonate, cadmium maleate, cadimum fumarate, cadmium crotonate, mercury maleate, mercury fumarate, mercury crotonate, tin maleate, tin fumarate, tin crotonate, nickel maleate, nickel fumarate, nickel crotonate, cobalt maleate, and cobalt crotonate;

Organic tin compounds such as dimethyl tin distearate, diethyl tin dilaurate, di-n-butyl tin dilurate, di-n-butyl tin distearate, di-n-butyl tin dicaprate, di-t-butyl tin dilaurate, di-octyl tin distearate, di-n-butyl tin maleate, di-n-butyl tin maleate laurate, di-n-butyl tin adipate, di-n-butyl tin sebacate, di-n-butyl tin succinate, dioctyl tin maleate, and dioctyl tin maleate laurate;

A salt of oxy-acid and a metal selected from the group consisting of metals of I$b$, II$b$, IV$b$ groups and VIII group of 4th period of the Periodic Table such as nickel salt and zinc salt of 12-oxyoctadecanoic acid; and A salt of amino acid and a metal selected from the group consisting of metals of I$b$, II$b$, IV$b$ groups and VIII group of 4th period of the Periodic Table such as nickel n-octadecylamino-1-methyl propionate and cobalt tetradecylamino propionate.

As said salt of amino-acid, γ-aminocarboxylic acid salt of metals of I$b$, II$b$ groups and VIII group of 4th period of the Periodic Table represented by the following formula is preferable,

RNHCH$_2$CH$_2$COO·M½

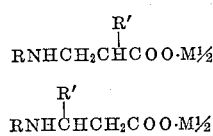

wherein R stands for alkyl or cycloalkyl having 4–18 carbon atoms, R' stands for a lower alkyl such as methyl and ethyl, and M stands for a metal element of I$b$, II$b$ groups and VIII group of 4th period of the Periodic Table.

When such γ-aminocarboxylic acid salt is explained with reference to a salt of metals of II$b$ group of the Periodic Table, the following compounds may be cited.

Zinc octadecylamino propionate, zinc octadecylamino-1-methyl propionate, zinc octadecylamino-2-methyl propionate, zinc hexadecylamino propionate, zinc hexadecylamino-1-methyl propionate, zinc hexadecylamino-2-methyl propionate, zinc tetradecylamino propionate, zinc tetradecylamino-1-methyl propionate, zinc tetradecylamino-2-methyl propionate, zinc dodecylamino propionate, zinc dodecylamino-1-methyl propionate, zinc dodecylamino-2-methyl propionate, zinc decylamino propionate, zinc decylamino-1-methyl propionate, zinc decylamino-2-methyl propionate, zinc octylamino propionate, zinc octylamino-1-methyl propionate, zinc octylamino-2-methyl propionate, zinc hexylamino propionate, zinc hexylamino-1-methyl propionate, zinc hexylamino-2-methyl propionate, zinc pentylamino propionate, zinc pentylamino-1-methyl propionate, zinc pentylamino-2-methyl propionate, zinc butylamino propionate, zinc butylamino-1-methyl propionate, zinc butylamino-2-methyl propionate, zinc tert-butylamino propionate, zinc tert-butylamino-1-methyl propionate, zinc cyclohexylamino propionate, zinc cyclohexylamino-1-methyl propionate, zinc cyclohexylamino-2-methyl propionate, zinc cyclopentylamino propionate, zinc cyclopentylamino-1-methyl propionate, zinc cyclopentylamino-2-methyl propionate, and cadmium octadecylamino propionate, cadmium octadecylamino-1-methyl propionate, cadmium octadecylamino-2-methyl propionate, cadmium hexadecylamino propionate, cadmium hexadecylamino-1-methyl propionate, cadmium hexadecylamino-2-methyl propionate, cadmium tetradecylamino propionate, cadmium tetradecylamino-1-methyl propionate, cadmium tetradecylamino-2-methyl propionate, cadmium decylamino propionate, cadmium decylamino-1-methyl propionate, cadmium decylamino-2-methyl propionate, cadmium octylamino propionate, cadmium octylamino-1-methyl propionate, cadmium octylamino-2-methyl propionate, cadmium hexylamino propionate, cadmium hexylamino-1-methyl propionate, cadmium hexylamino-2-methyl propionate, cadmium pentylamino propionate, cadmium pentylamino-1-methyl propionate, cadmium pentylamino-2-methyl propionate, cadmium butylamino propionate, cadmium butylamino-1-methyl propionate, cadmium butylamino-2-methyl propionate, cadmium cyclohexylamino propionate, cadmium cyclohexylamino-1-methyl propionate, cadmium cyclohexylamino-2-methyl propionate, or mercury octadecylamino propionate, mercury octadecylamino-1-methyl propionate, mercury octadecylamino-2-methyl propionate, mercury hexadecylamino propionate, mercury hexadecylamino-1-methyl propionate, mercury hexadecylamino-2-methyl propionate, mercury decylamino propionate, mercury decylamino-1-methyl propionate, mercury decylamino-2-methyl propionate, mercury octylamino propionate, mercury octylamino-1-methyl propionate, mercury octylamino-2-methyl propionate, mercury hexylamino propionate, mercury hexylamino-1-methyl propionate, mercury hexylamino-2-methyl propionate, mercury pentylamino propionate, mercury pentylamino-1-methyl propionate, mercury pentylamino-2-methyl propionate, mercury butylamino propionate, mercury butylamino-1-methyl propionate, mercury butylamino-2-methyl propionate, mercury cyclohexylamino propionate, mercury cyclohexylamino-1-methyl propionate and mercury cyclohexylamino-2-methyl propionate.

In this invention, it is also possible to use together with said metal salts of carboxyl compounds a complex salt comprising β-diketon such as nickel salt and zinc salt of acetylacetone and a metal selected from the group consisting of metals of Ib, IIb, IVb groups and VIII group of 4th period of the Periodic Table; a salt of β-keto acid ester such as nickel salt and zinc salt of ethyl acetacetate and a metal selected from the group consisting of Ib, IIb, IVb groups and VIII group of 4th period of the Periodic Table.

A favorable result is obtained when said organic metal salts are added in an amount of 0.05–2% by weight as a metal component to polyolefin.

An organic phosphoric ester compound becoming the feature of this invention used for improving the dispersion and solubility of said metal compound to polyolefin, at the same time, for advancing the rate of diffusion of a dye is mono- or di-ester of phosphoric acid and saturated and unsaturated alkyl-, aryl-, alkylaryl-, arylalkyl- and cycloalkyl-phosphates introduced from said ester; aluminium salts of said phosphates; salts of metals of VIII group of 4th period of said phosphates; and salts of metal of II group of said phosphates.

When explanations are made with reference to a phosphoric ester compound limited as aforesaid used in this invention, the following may be cited.

Aliphatic phosphates such as monobutyldihydro phosphate or dibutylhydro phosphate, mono- or di-amyl phosphate, mono- or di-hexyl phosphate, mono- or di-heptyl phosphate, mono- or di-octyl phosphate, mono- or di-nonyl phosphate, mono- or di-decyl phosphate, mono- or di-dodecyl phosphate, mono- or di-tetradecyl pohsphate, mono- or di-octadecyl phosphate, mono- or di-nonadecyl phosphate, mono- or di-dococyl phosphate, mono- or di-1-methylpentyl phosphate, mono- or di-2-pentyl phosphate, mono- or di-5-methylhexyl phosphate, mono- or di-2-ethylhexyl phosphate, mono- or di-t-butyl phosphate, mono- or di-isobutyl phosphate, hexyloctyl phosphate, butylhexyl phosphate, decylocadecyl phosphate, decyl-2-ethylhexyl phosphate and their aluminium, nickel, cobalt, iron, magnesium, calcium, zinc, cadmium, barium and mercury salts;

Aryl phosphates such as mono- or di-phenyl phosphate and their aluminium, nickel, cobalt, iron, magnesium, calcium, zinc, cadmium, barium and mercury salts;

Alkylaryl phosphates such as mono- or di-butylphenylene phosphate, mono- or di-p-ter-butylphenylene phosphate, mono- or di-nonylphenylene phosphate and mono- or di-p-nonylphenylene phosphate and their aluminium, nickel, cobalt, iron, magnesium, calcium, zinc, cadmium, barium and mercury salts;

Arylalkyl phosphates such as mono- or di-phenylbutyl phosphate and their aluminium, nickel, cobalt, iron, magnesium, calcium, zinc, cadmium, barium and mercury salts;

Cycloalkyl phosphates such as mono- or di-cyclohexyl phosphate, mono- or di-cycloheptyl phosphate, and mono- or di-cyclopentyl phosphate and their aluminium, nickel, cobalt, iron, magnesium, calcium, zinc, cadmium, barium and mercury salts.

Of the aforesaid phosphoric ester compounds, alkyl phosphates having 4–12 carbon atoms and their aforementioned salts develop excellent effects.

The amount to be added of the phosphoric ester compounds limited as mentioned above is 0.05–5% by weight, preferably 0.1–3% based on polyolefin.

The phosphoric ester compounds in this invention may be added either simultaneously with or separately from the aforesaid organic salts of metals of Ib, IIb, IVb groups or VIII groups of 4th period of the Periodic Table to polyolefin.

What matters is to let said phosphoric ester compounds and said organic metal salts coexist with the aforesaid metal compounds containing carboxyl radical during and after the melt shaping.

Such addition can be carried out freely in accordance with the conventional technique.

Many of the aforesaid phosphoric ester compounds according to this invention are normally white solid, or liquid, and especially their salts of VIII group of 4th period display green color when they are nickel salts, violet color when they are cobalt salts and their complex salts display yellowish brown. Upon adding said phosphoric ester compounds to polyolefin or blended composition of polyolefin and organic metal compounds and melting them together, the former melt completely and would not hinder the filtering step to say nothing of the melt shaping or melt spinning and stretching steps of the mixture.

The phosphoric ester compounds limited as aforesaid of this invention have unique actions of improving the dispersion and solubility of the aforesaid organic metal salts becoming dye-bonding groups to polyolefin, making clearer the color upon dyeing, and advancing the rate of diffusion of the dye.

Such unique unexpected effects of the aforesaid organic metal salts, and the phosphoric ester compound, the feature of this invention are made clear by the following experiments.

When the melting point of a carboxylate alone (A), an alkyl phosphate alone (B), and a 1:1 mixture by weight of a carboxylate and alkyl phosphate are calculated from the endothermic peaks of the differential thermal analysis, the results as shown in Table 1 were obtained.

These results show phosphates which can hardly melt alone smoothly melt by comelting with carboxylates and there exist special chemical unexpected effects at the time of comelting of these two components.

TABLE 1.—MELTING POINTS OF ORGANIC CARBOXYLATES AND PHOSPHATES AND THE CHANGES OF MELTING POINTS (° C.) WHEN SAID TWO ARE MIXED 1:1.

| Component (A) organic carboxylate | Component (B) phosphate | Mixed composition of (A)-(B) (° C.) |
|---|---|---|
| Nickel stearate (95–100° C.) | Nickel 2-ethylhexyl phosphate (250° C.). | 140 |
| Zinc stearate (120° C.) | Nickel 2-ethylhexyl phosphate (250° C.). | 120 |
| Nickel 12-oxyoctadecanoate (115° C.). | Aluminium 2-ethylhexyl phosphate (280° C.). | 145 |
| Zinc caproate (122° C.) | Nickel dodecyl phosphate (305° C.). | 130 |
| Nickel stearate (95–100° C.) | Nickel n-pentyl phosphate (300° C.). | 145 |

Polyolefin as defined in this invention is a homopolymer such as ethylene, propylene, 3-ethyl-butene-1, 4-methylpentene-1, 5-methylhexene-1, copolymers of these α-olefins, and polymer blend compositions consisting of mainly these copolymers and other polymers such as polyamide, polyester, polyurea, polyurethane, epoxy resin and carbonate resin.

The polyolefin of this invention may contain the conventional antioxidants such as of phenol and amine series, ultraviolet ray absorbents consisting of benzophenol derivatives, etc., flatting agents such as titanium oxide, pigments, fluorescent brighteners and dispersing agents consisting of an alkaline earth metal salt of fatty acid or dioctyl phthalate.

Small amounts of these additives would not damage the effects of this invention.

As dyes whose use on shaped articles such as fibers and films obtained from the composition of this invention results in remarkable advance of not only diffusion of dyes, but also chromaticity after dyeing, there are specifically the following groups of dyes;

Colored chelating agents group consisting of monoazo dyes having strong donor actions of the following formulae:
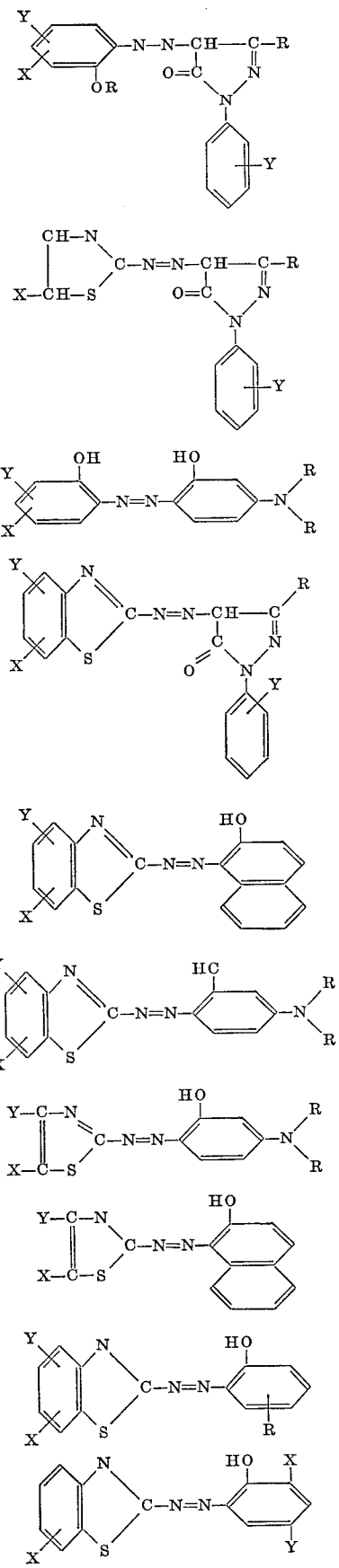
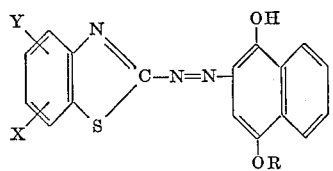
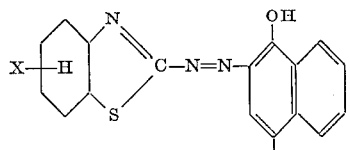
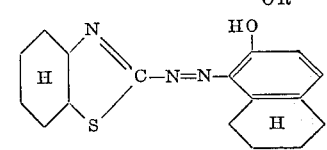
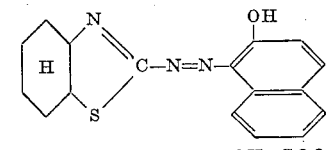
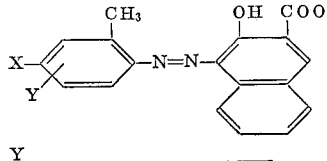
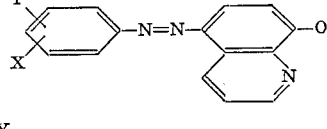
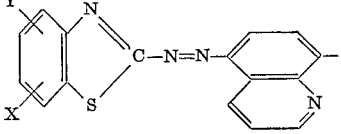
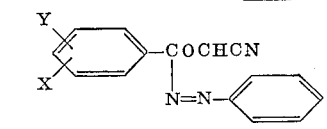
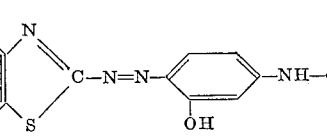
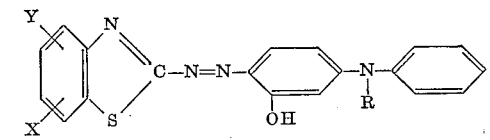
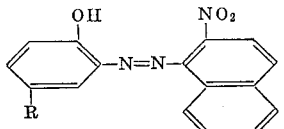
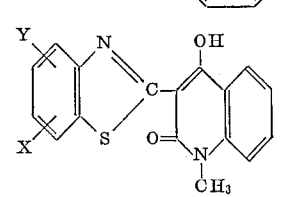

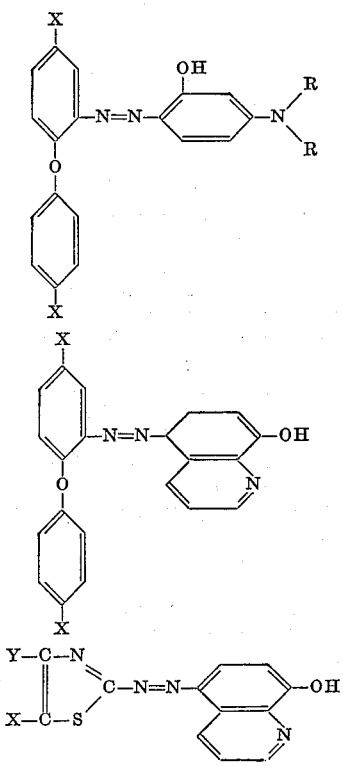

wherein R stands for alkyl, cycloalkyl, aryl or hydrogen; X, Y stand for hydrogen, alkyl, cycloalkyl, alkoxy, acyl radicals, nitro radical, halogen or trifluoromethyl radical; and azoic dye group using the following coupling components and combining with various azo components.

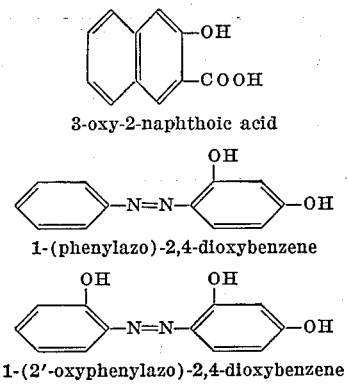

In order to dye the polyolefin composition of this invention with the aforesaid dyes, water or liquid consisting of mainly water and a nonion, anion or cation surface active agent or a small amount of organic solvent is used as a medium; however, even if the dyes are not heated and dyed in the aforesaid medium, it is possible to react the organic metal compound of the polyolefin with the dyes thereby forming chelate compounds by drying the composition attached with the dye liquor and heating dry or steam heating the same. The dyeing temperature at this time is preferably within the range of 50-145° C. When the temperature is below 50° C., the chelating reaction between the metal compound in the polyolefin substrate and the dyes is very difficult to take place, not only that but the diffusion inside the polyolefin substrate of the aforesaid dyes cannot be expected. The dyeing period at this occasion is within the range of 5-180 minutes and freely controllable in accordance with the polyolefin composition, dye, dyeing medium, temperature and the dyeing method employed.

Further, it is possible to adopt the conventional dyeing methods such as dip dyeing, textile printing, discharge, resist, color discharge, printing, thermal process and dry heat dyeing for this dyeing.

At this occasion it is possible to employ a cloth dyeing machine containing piece dyeing machines such as cotton dyer, cheese dyer, sliver dyer, winch and jegger and apparatuses of padder and mangle for continuous dyeing.

This invention has most remarkable features in effects in the following three points.

In the first place, the aforesaid phosphoric ester compound according to this invention works on the aforesaid metal salt of the compound containing carboxyl radical, improving remarkably the dispersion and solubility of the latter to molten polyolefin.

Secondly, the aforesaid phosphoric ester compound according to this invention raising the hydrophilic property of the polyolefin substrate, it advances the rate of diffusion of the dye molecules to the polyolefin, thereby remarkably advancing the accessibility of the dye molecules to the organic metal salt becoming the chair of dyeing of the dye.

Thirdly, the aforesaid phosphoric ester compound according to this invention advancing also the transparency of the polyolefin substrate, it develops a remarkable effect of conspicuously improving the brightness, in particular chromaticity of the dyed matter in combination with the aforesaid effect of advancing the diffusion.

The aforementioned effects of this invention are considered ascribable to the two functions of said phosphoric ester compound when added; one is that it imparts hydrophilic property to the polyolefin, facilitating swelling of the polyolefin due to hot water at the time of dyeing, and two is activation of the molten surface contributing to the advancement of solubility and dispersion to the molten polyolefin of the organic metal salt containing a metal of I$b$, II$b$, IV$b$ groups and VIII group of 4th period of the Periodic Table.

Further, according to this invention because the dispersion of an aliphatic carboxylate which is strongly polar to the non-polar polyolefin substrate is advanced, the uniformity of distribution of the organic metal salt of metals of I$b$, II$b$, IV$b$ groups and VIII group of 4th period per unit volume improved, as a result the chromaticity of color tone or the stimulus purity of the dyed matter is remarkably improved.

As explained so far, this invention is applicable to the industrial production of fibers, bristles, monofilaments, guts, films and sheets consisting of dyeable polyolefin having excellent dyeability and dye-acceptability toward specific dyes which can form chelate compounds with the organic metal salts inside the polyolefin, and can further be utilized for improving printability and adhesive property of polyolefin shaped articles.

Hereinafter the examples of this invention will be shown and excellent effects of this invention will be better understood by taking these examples into account.

Examples 1-4

(a) Preparation of polyolefin composition.—To powdered isotactic polypropylene having intrinsic viscosity of 1.53 were added 3% by weight of zinc stearate and 0.3% by weight of the following phosphoric ester compounds, respectively.

Example 1.—An equimolar mixture of di-n-octyl phosphate and monoctyl phosphate
Example 2.—A nickel salt of an equimolar mixture of di-n-octyl phosphate and monoctyl phosphate
Example 3.—A zinc salt of an equimolar mixture of di-n-octyl phosphate and monoctyl phosphate
Example 4.—An aluminium salt of an equimolar mixture of di-n-octyl phosphate and monoctyl phosphate.

They were mixed in a Henschel mixer, thereafter the mixture was melt-kneaded by an extruder at 200° C. according to the conventional process, the obtained strand was cut into chips of a constant length of 3-5 mm. The chips were extruded through a spinneret having 24 orifices of 0.8 mm. diameter at the spinning temperature of 240° C., and the obtained non-stretched filaments were wound at a constant speed (600 m./min.).

Four 100 D/24 Fil. yarns obtained by stretching 450% the nonstretched filaments under heat (using a heat plate) (1) and another yarn same as (1) but not containing the phosphoric ester compounds (2) as a control were prepared as objects of dyeing.

(b) Dyeing process:

Dyeing was carried out using the following dye under the following conditions.

Dye.—2-(2'-oxy-5'-chlorphenylazo)-5-diethyl aminophenol

Dyeing conditions:
  Concentration of a dye bath (OWF based on
    the objects of dyeing) _____percent__  4
  Liquor ratio _____ 1:100
  Dyeing temperature _____° C__  96
  Dyeing period _____min__  60

(c) Dyed matters:

The results represented by ICI numbers calculated from the tristimulus values of dyed matters are shown in Table 2. The results were that in the case of the polypropylene fibers containnig said phosphoric ester compounds, apparently the chromaticity was advanced and the color tones became brighter.

To the yarns of Examples 7 and 8, a dye of the formula

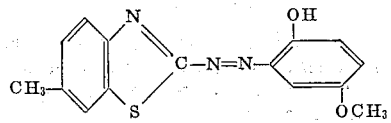

Examples 9–12

(a) Preparation of polyolefin compositions.—To 96.5 parts of powdered isotactic polypropylene having intrinsic viscosity of 1.53 (as measured in tetralin at 135° C.) were added 3 parts of nickel stearate and 0.5 part of the following phosphoric ester compounds, respectively.

Example 9.—An equimolar mixture of mono-2-ethylhexyl phosphate and di-2-ethylhexyl phosphate.

Example 10.—An equimolar mixture of nickel mono-2-ethylhexyl phosphate and nickel di-2-ethylhexyl phosphate.

Example 11.—An equimolar mixture of zinc mono-2-ethylhexyl phosphate and zinc di-2-ethylhexyl phosphate.

Example 12.—An equimolar mixture of aluminium mono-2-ethyl hexyl phosphate and aluminium di-2-ethylhexyl phosphate.

The mixtures were melt-kneaded inside an extruder heated to 220° C., the obtained chips and the chip same as those but not containing any phosphoric ester compound as a control were extruded through a spinneret having 24 orifices of 0.8 mm. diameter according to the conventional method. The non-stretched filaments thus melt

TABLE 2.—ICI NUMBERS

| Ex. | Samples | Color tone | Measured values | | | | |
|---|---|---|---|---|---|---|---|
| | | | Main wave length (mμ) | Chromaticity (percent) | Brightness, Y | Color index | |
| | | | | | | x | y |
| 1 | Polypropylene containing zinc stearate and mono- and di-octyl phosphates of this invention. | Brilliant scarlet red. | 638 | 69.6 | 12.7 | 0.601 | 0.296 |
| 2 | Polypropylene containing zinc stearate and nickel mono- and di-octyl phosphates of this invention. | ___do___ | 631 | 72 | 12.7 | 0.6039 | 0.2976 |
| 3 | Polypropylene containing zinc stearate and zinc mono- and di-octyl phosphates of this invention. | ___do___ | 632 | 71.5 | 12.5 | 0.605 | 0.300 |
| 4 | Polypropylene containing zinc stearate and aluminum mono- and di-octyl phosphates of this invention. | ___do___ | 632 | 71.5 | 12.5 | 0.605 | 0.300 |
| Control | Polypropylene containing zinc stearate only | Dark scarlet | 624 | 65.0 | 12.0 | 0.575 | 0.304 |

Examples 5–8

The yarns of Examples 1–4 and the yarn of said control were respectively dyed with dyes of the following formulae under the same conditions as in Examples 1–4, and the ICI numbers as shown in Tables 3 and 4 were obtained from the tristimulus values. The yarns according to this invention advanced remarkably in their chromaticity.

To the yarns of Examples 5 and 6, a dye of the formula spun were passed onto a plate heated to 120° C., thereby stretched 400%. The obtained four 75 D/24 Fil. yarns and the control yarn were made objects of dyeing.

(b) Dyeing process.—Dyeing was carried out in a solution wherein a dye of the following formula in an amount of 4% by weight based on the weight of fibers was emulsified and dispersed in water in an amount 100 times that of the dye at 98° C. for 60 minutes.

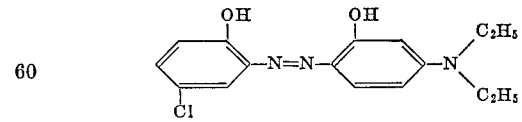

TABLE 3.—ICI NUMBERS

| Ex. | Samples | Color tone | Measured values | | | | |
|---|---|---|---|---|---|---|---|
| | | | Main wave length (mμ) | Chromaticity (percent) | Brightness, Y | Color index | |
| | | | | | | x | y |
| 5 | Polypropylene containing zinc stearate and mono- and dioctyl phosphates of this invention. | Brilliant green | 495.5 | 26 | 11.7 | 0.275 | 0.332 |
| 6 | Polypropylene containing zinc stearate and nickel mono- and di-octyl phosphates of this invention. | ___do___ | 494.3 | 38.2 | 11.7 | 0.288 | 0.341 |
| Control | Polypropylene containing zinc stearate only | Grayish green | 496.2 | 19.7 | 11.3 | 0.226 | 0.333 |

TABLE 4.—ICI NUMBERS

| Ex. | Samples | Color tone | Measured values | | | | |
|---|---|---|---|---|---|---|---|
| | | | Main wave length (mμ) | Chromaticity (percent) | Brightness, Y | Color index x | Color index y |
| 7 | Polypropylene containing zinc stearate and zinc mono- and di-octyl phosphate of this invention. | Brilliant green | 493.6 | 37.2 | 10.2 | 0.230 | 0.335 |
| 8 | Polypropylene containing zinc stearate and aluminum mono- and di-octyl phosphate of this invention. | ___do___ | 493.8 | 37.2 | 10.2 | 0.230 | 0.335 |
| Control | Polypropylene containing zinc stearate only | Grayish green | 496.2 | 19.7 | 11.3 | 0.275 | 0.332 |

(c) Dyed matters.—The result represented by ICI numbers calculated from the tristimulus values of the dyed matters were as shown in Table 5, wherein the yarns according to this invention remarkably advanced in chromaticity as compared with the control yarn.

TABLE 5.—ICI NUMBERS

| Ex. | Samples | Color tone | Measured values | | |
|---|---|---|---|---|---|
| | | | Main wave length (mμ) | Chromaticity (percent) | Brightness, Y |
| 9 | Filaments of polypropylene containing nickel stearate and mono- and di-2-ethylhexyl phosphates of this invention. | Brilliant red | 663 | 67.5 | 11.7 |
| 10 | Filaments of polypropylene containing nickel stearate and nickel mono- and di-2-ethylhexyl phosphates of this invention. | ___do___ | 665 | 69.7 | 11.7 |
| 11 | Filaments of polypropylene containing nickel stearate and zinc mono- and di-2-ethylhexyl phosphates of this invention. | ___do___ | 668 | 69.2 | 12.1 |
| 12 | Filaments of polypropylene containing nickel stearate and aluminium mono- and di-2-ethylhexyl phosphates of this invention. | ___do___ | 688 | 68.3 | 11.8 |
| Control | Filaments of polypropylene containing nickel stearate only. | Reddish brown | 613 | 20.9 | 12.0 |

Examples 13–16

The filaments (yarns) of Examples 9–12 and the control filaments (yarn) referred to in the description of Examples 9–12 were dyed in a solution comprising a dye of the following formula in an amount of 4% by weight based on the weight of fibers and water in an amount 100 times that of the dye at 98° C. for 60 minutes as in Examples 9–12. The results were as shown in Table 6. The filaments added with the phosphoric ester compounds advanced remarkably in chromaticity and brightness of the dyed matter increased.

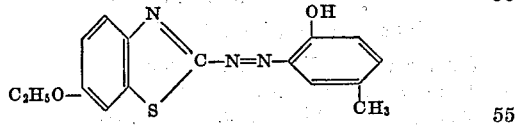

Examples 17–20

The yarns (filaments) of Examples 9–12 and the control yarn (filaments) referred to therein were dyed in a dyeing solution comprising a dye of the following formula in an amount of 4% by weight based on the weight of fiber and water in an amount 100 times that of the dye under the same conditions as in Examples 9–12. The results were as shown in Table 7. The filaments added with the phosphoric ester compounds were improved remarkably in chromaticity and their brightness advanced as compared with the control filaments.

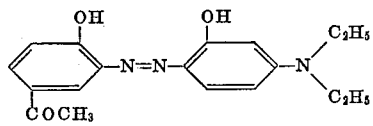

TABLE 6.—ICI NUMBERS

| Ex. | Samples | Color tone | Measured values | | |
|---|---|---|---|---|---|
| | | | Main wave length (mμ) | Chromaticity (percent) | Brightness, Y |
| 13 | Filaments of polypropylene containing nickel stearate and mono- and di-2-ethyl-hexyl phosphates of this invention. | Brilliant green | 494.2 | 34.6 | 7.0 |
| 14 | Filaments of polypropylene containing nickel stearate and nickel mono- and di-2-ethylhexyl phosphates of this invention. | ___do___ | 494.2 | 32.9 | 7.0 |
| 15 | Filaments of polypropylene containing nickel stearate and zinc mono- and di-2-ethylhexyl phosphates of this invention. | ___do___ | 490.3 | 36.7 | 7.1 |
| 16 | Filaments of polypropylene containing nickel stearate and aluminium mono- and di-2-ethylhexyl phosphates of this invention. | ___do___ | 490.3 | 37.6 | 7.1 |
| Control | Filaments of polypropylene containing nickel stearate only. | Dark green | 494.9 | 21.6 | 6.9 |

TABLE 7.—ICI NUMBERS

| Ex. | Samples | Color tone | Main wave length (mμ) | Chromaticity (percent) | Brightness, Y |
|---|---|---|---|---|---|
| 17 | Polypropylene containing nickel stearate and mono- and di-2-ethylhexyl phosphates of this invention. | Brilliant red | 624 | 52.4 | 18.7 |
| 18 | Polypropylene containing nickel stearate and nickel mono- and di-2-ethylhexyl phosphates of this invention. | do | 611 | 50.6 | 18.7 |
| 19 | Polypropylene containing nickel stearate and zinc mono- and di-ethylhexyl phosphates of this invention. | do | 629 | 53.5 | 18.8 |
| 20 | Polypropylene containing nickel stearate and aluminium mono- and di-ethylhexyl phosphates of this invention. | do | 629 | 54.6 | 18.8 |
| Control | Polypropylene containing nickel stearate only. | Dark red | 604 | 28.7 | 19.6 |

Examples 21–23

In Examples 9, 11 and 12, instead of mono- and di-2-ethylhexyl phosphates or their salts, when Example 21.—An equimolar mixture of mono- and di-lauryl phosphates Example 22.—An equimolar mixture of cadmium mono- and di-lauryl phosphates Example 23.—An equimolar mixture of aluminium mono- and di-lauryl phosphates were used, respectively, the same effects were obtained.

Examples 24–27

(a) Preparation of polyethylene composition.—To powdered polyethylene having an average molecular In the chromaticity obtained according to ICI Numbers (calculated) from the tristimulus values of these colors were clear differences as shown in Table 8.

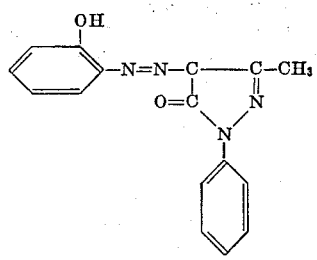

TABLE 8.—ICI NUMBERS

| Ex. | Samples | Color tone | Main wave length (mμ) | Chromaticity (percent) | Brightness Y | Color index x | Color index y |
|---|---|---|---|---|---|---|---|
| 24 | Polyethylene containing copper stearate, dibutyl tin maleate and didecyl phosphate of this invention. | Brilliant yellow | 580 | 85.6 | 43.1 | 0.512 | 0.461 |
| 25 | Polyethylene containing copper stearate, dibutyl tin maleate and nickel dilauryl phosphate of this invention. | do | 582 | 91.3 | 43.1 | 0.507 | 0.458 |
| 26 | Polyethylene containing copper stearate, dibutyl tin maleate and zinc didecyl phosphate of this invention. | do | 579 | 85.8 | 43.0 | 0.486 | 0.460 |
| 27 | Polyethylene containing copper stearate, dibutyl tin maleate and aluminium didecyl phosphate of this invention. | do | 579 | 85.0 | 43.0 | 0.486 | 0.460 |
| Control | Polyethylene containing copper stearate and dibutyl tin maleate only. | Yellow | 580 | 72.6 | 43.8 | 0.466 | 0.436 | weight of 38,000 produced by medium-pressure method were added 3% by weight of copper stearate and 0.3% by weight of dibutyl tin maleate for prevention of thermal discoloration of the foregoing two, further 0.5% by weight of the following phosphoric ester compounds, respectively:

Example 24.—Didecyl phosphate
Example 25.—Nickel dilauryl phosphate
Example 26.—Zinc didecyl phosphate
Example 27.—Aluminium didecyl phosphate When the mixtures were melted at 220° C. according to the conventional method, chips having a bluish green color were obtained. The chips were again melted at 250° C., and spun and stretched by the spinning machine used in Examples 1–4. The yarns thus obtained (1) and the yarn same as (1) but not containing the phosphoric ester compounds as a control were made objects of dyeing.

(b) Dyeing process and dyed matters.—When the aforesaid yarns were dyed in a 4% OWF solution of a dye of the following formula, the yarns whose composition were according to this invention were dyed in appreciably brilliant yellow, whereas the control yarn was dyed in dull yellowish brown only.

Examples 28–30

In Examples 24, 26 and 27, when

Example 28.—Dioctyl phosphate
Example 29.—Cadmium dioctyl phosphate
Example 30.—Aluminium dioctyl phosphate were used, respectively instead of didecyl phosphate or its salts, the similar effects of advanced chromaticity (stimulus purity) were achieved.

Example 31

To powdered isotactic polypropylene having intrinsic viscosity of 1.53 (as measured in tetralin at 135° C.) were added the following compounds. The obtained powders (A) and (B) were melted at 105° C. and formed into chips according to the conventional methods, thereafter the chips were spun and stretched and yarns were obtained.

Composition: Parts
(A) Polypropylene _____ 100
    Nickel stearate _____ 3
(B) Polypropylene _____ 100
    Nickel stearate _____ 3
    Zinc 2-ethylhexylphosphate _____ 0.5

Next, the slices of these yarns were dyed under the following conditions. In the Composition B according to this invention, dispersion of nickel stearate has been remarkably improved.

Dye:

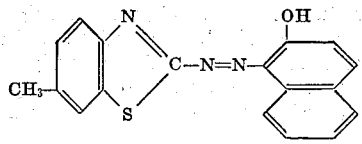

Dyeing conditions of slices:
Concentration _____ g./l__ 0.4
Temperature _____ °C__ 90
Period _____ minutes__ 30

Examples 32–39

(a) Preparation of polypropylene composition.—To powdered isotactic polypropylene having intrinsic viscosity of 1.53 (as measured in tetralin at 135° C.) were added 4% by weight of various capriates described in Table 9. These were mixed in powder states separately. The mixtures were heated to 205° C., co-melted and pelletized. The obtained chip group (A), and chip group (B) obtained by pelletizing under the same conditions as those of (A) after adding 0.4% by weight of cobalt dioctadecyl phosphate to the aforesaid mixtures, were respectively melted at 220° C., extruded through a spinneret having 6 orifices of 0.8 mm. diameter and the extruded filaments were stretched 500% by heated plate, and 24 D/6 fil. yarns A' and B' were obtained.

(b) Dyeing and dyed matters.—These yarns were immersed in a dye bath having a liquor ratio of 1:100 wherein a dye of the following formula was dispersed at a ratio of 0.2 g./l. in water and dyed under the same conditions of at 96° C. for 60 minutes, and the results as shown in Table 9 were obtained. As compared with A' group, B' group showed remarkably advanced transparency of the dyed matters and chromaticity (purity).

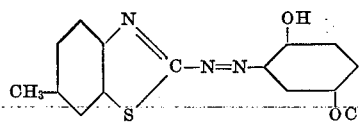

TABLE 9.—COLOR TONE OF THE DYED MATTERS

| Ex. | Kind of capriates | (A') Yarn of polypropylene containing 4% by weight of a capriate | (B') Yarn of polypropylene wherein 0.45% by weight of cobalt dioctadecyl phosphate has been added to (A') |
|---|---|---|---|
| 32 | Copper capriate | Dark green | Marine green. |
| 33 | Silver capriate | Grey | Green. |
| 34 | Zinc capriate | Dark blue green | Brilliant blue green. |
| 35 | Cadmium capriate | ____do____ | Brilliant green. |
| 36 | Mercury capriate | Dark blue grey | Blue green. |
| 37 | Iron capriate | Dark grey | Navy blue. |
| 38 | Cobalt capriate | Dark marine blue | Concentrated marine blue. |
| 39 | Nickel capriate | Dark green | Brilliant green. |

Examples 40–48

(a) Preparation of polypropylene compositions.—To powdered isotactic polypropylene having intrinsic viscosity of 1.72 (as measured in tetralin at 135° C.) were added 5% by weight of nickel salts of various aliphatic carboxylic acids described in Table 10, respectively. The yarn group A obtained by pelletizing, spinning and stretching the aforesaid mixtures under the same conditions as in Examples 32–39 and the yarn group B obtained similarly after further adding 0.3% by weight of an equimolar mixture of nickel monocyclohexyl phosphate and nickel dicyclohexyl phosphate were made objects of dyeing.

(b) Dyeing and dyed matters.—The aforesaid yarns were dyed using an azo dye capable of forming a chelate compound of the following formula under the same conditions mentioned hereinbelow, respectively. Of the ICI Numbers obtained from the self-recording reflectance curves of the dyed matters, changes of chromaticity (chromatoticity, purity) especially closely related to the color tones of the dyed matters were shown in Table 10.

Dye:

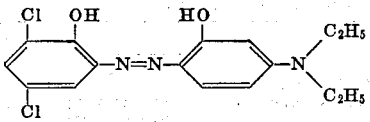

Dyeing conditions:
Concentration _____ g./l___ 0.4
Liquor ratio _____ 1:100
Temperature _____ °C__ 96
Dyeing period _____ minutes__ 60

TABLE 10.—CHROMATOTICITY DUE TO CO-EXISTENCE OF MONO- AND DI-CYCLOHEXYL PHOSPHATES (%)

| | | Samples | |
|---|---|---|---|
| Ex. | Organic carboxylates | (A) Dyed polypropylene containing nickel aliphatic monocarboxylate only | (B) Dyed (A) added with 0.3% by weight of (equimolar mixture of) nickel mono- and di-cyclohexyl phosphates |
| 40 | Nickel caproate | 19.7 | 32.5 |
| 41 | ____do____ | 20.3 | 57.2 |
| 42 | ____do____ | 21.2 | 58.0 |
| 43 | Nickel laurate | 22.6 | 57.7 |
| 44 | Nickel palmitate | 23.2 | |
| 45 | Nickel stearate | 21.7 | 65.4 |
| 46 | Nickel arachidate | 22.4 | 56.3 |
| 47 | Nickel behenate | 20.1 | 51.9 |
| 48 | Nickel cerotate | 20.0 | 41.7 |

Examples 49–53

(a) Preparation of polypropylene compositions.—To powdered isotactic polypropylene having intrinsic viscosity of 1.53 (as measured in tetralin at 135° C.) were added 2% by weight of various octylamino-1-methyl propionates described in Table 11 together with 0.2% by weight of 1,1,3 - tri - (2'-methyl-4'-oxy-5'-tert-butylphenyl) butane. The mixtures were co-melted at 205° C. as in Examples 32–39, and the molten mixtures were extruded through a spinneret having an orifice of 3 mm. in diameter. The obtained strands were cut into a constant length of 3 mm., the resultant chip groups (A) was melt-extruded through a spinneret having 6 orifices of 0.8 mm. diameter according to the conventional method, the obtained filaments were stretched 500% and 24 D/6 fil. yarn group A' was obtained.

On the other hand, for the purpose of comparison, upon spinning the aforesaid chip group (A), 0.3% by weight of an equimolar mixture of mercury mono- and di-butylphenyl phosphates was added and yarn group B' was prepared by spinning and stretching the mixture under the same conditions as those of the yarn group A'.

(b) Dyeing and dyed matters.—The aforesaid yarn group A' and B' were dyed using a dye of the following formula, and the chromaticity (percent) calculated from the self-recording reflectance curves of the dyed matters was shown in Table 11.

As a result, effects of remarkable advance of chromaticity were observed in the yarn group B' according to the process of this invention.

Dye:

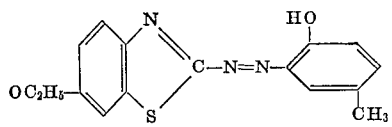

Dyeing conditions:
Concentration _____ g./l__ 0.3
Temperature _____ °C__ 97
Dyeing period _____ minutes__ 90
Liquor ratio _____ 1:100

TABLE 11.—CHANGE OF CHROMATICITY (CHROMATOTICITY) (%) DUE TO CO-EXISTENCE OF MERCURY p-BUTYLPHENYL PHOSPHATE

| | | Samples | |
|---|---|---|---|
| | | (A') | (B') |
| Ex. | Kind of octylamino 1-methyl propionates | Yarn of polypropylene containing octylamino-1-methyl propionate | (A') added with mercury mono- and di-p-butyl-phenyl phosphates |
| 49 | Copper octylamino-1-methyl propionate. | 20.9 | 32.0 |
| 50 | Zinc octylamino-1-methyl propionate. | 22.7 | 38.1 |
| 51 | Mercury octylamino-1-methyl propionate. | 15.6 | 23.4 |
| 51 | Cobalt octylamino-1-methyl propionate. | 21.6 | 39.2 |
| 53 | Nickel octylamino-1-methyl propionate. | 22.5 | 35.9 |

Examples 59–61

(a) Preparation of poly-3-methylbutene-1 composition.—To poly-3-methylbutene-1 containing 87% of n-heptane-insoluble parts having intrinsic viscosity of 2.01 (as measured in tetralin at 135° C.) were added 4% by weight of nickel aminodicarboxylate of the following formula and 0.3% by weight of dibutyl tin maleate. The mixture was heated to 270° C., and the chip A prepared therefrom and the chip B prepared from the foregoing mixture added further with 0.5% by weight of dinonadecyl phosphate were spun at 280° C. to prepare yarn groups A' and B', respectively as objects of dyeing.

$$\begin{array}{c} CH_3 \\ | \\ C_{18}H_{37}N-CH_2-CHCOO \\ | \\ CH_2COO\text{——}Ni \end{array}$$

(b) Dyeing.—The aforesaid yarns were dyed with three different dyes, respectively. The degrees of exhaustion of the dye bath (percent) at that occasion were shown in Table 12.

As a result, effects of advanced degrees of exhaustion of the dye bath were apparently observed when dinonadecyl phosphate according to this invention was added.

(c) Dyeing conditions:
Concentration _____ percent__ 3
Temperature _____ °C__ 96
Liquor ratio _____ 1:100
Period _____ minutes__ 60

TABLE 12.—DEGREES OF EXHAUSTION OF THE DYE BATH (PERCENT)

| | | Samples | |
|---|---|---|---|
| | | (A') | (B') |
| Ex. | Dyes | Poly-3-methylbutene-1 added only with said nickel aminodicarboxylate | (A') added further with dinonadecyl phosphate |
| 59 | 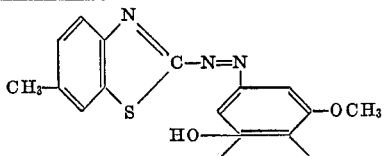 | 41 Light blue | 67 Brilliant blue |
| 60 | 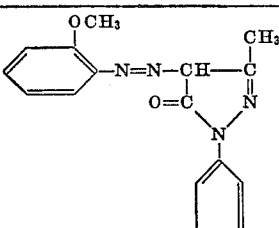 | 32 Light yellow | 61 Yellow |
| 61 | 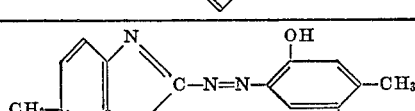 | 42 Green | 71 Dark marine green |

Examples 54–58

In Examples 54, 55, 56, 57 and 58 wherein cadmium monocycloheptyl phosphate was used instead of mercury mono- and di-p-butylphenyl phosphates in Examples 49, 50, 51, 52 and 53, effects of advanced chromaticity similar to Examples 49–53 were obtained.

Examples 62, 63

To powdered isotactic polypropylene having intrinsic viscosity of 1.53 (as measured in tetralin at 135° C.) were added the powders of following compositions. The obtained mixed powders A, B and C were melted at 205° C. and formed into chips according to the conventional method, and yarns were prepared by spinning and stretching these chips.

In compositions B and C according to this invention, the dispersing and solubilizing states of cobalt tetradecylamino propionate were remarkably improved.

Composition:

| Control | Example 62 | Example 63 |
|---|---|---|
| (A) | (B) | (C) |
| Cobalt tetradecylamino propionate, —3%. | Cobalt tetradecylamino propionate, —3%. Calcium 2-ethylhexyl phosphate, —0.3%. | Cobalt tetradecylamino propionate, —3%. Magnesium 2-ethylhexyl phosphate, —0.3%. |

Slicing dyeing conditions.—Dye:

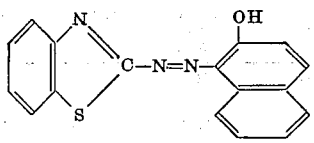

Concentration _____ g./l__ 0.4
Temperature _____ ° C__ 80
Period _____ minutes__ 30
Liquor ratio _____ indefinite Examples 64 and 65

Instead of calcium 2-ethylhexyl phosphate added to the composition B of Example 62 and magnesium 2-ethylhexyl phosphate added to the composition C of Example 63, when Example 64.—Barium phenylbutyl phosphate, and
Example 65.—Magnesium phenylbutyl phosphate were added, respectively, effects of excellent dispersion and solubility of cobalt tetradecylamino propionate to the polypropylene substrate were observed as in Examples 62 and 63.

Examples 66–74

(a) Preparation of polypropylene compositions.—To powdered isotactic polypropylene having intrinsic viscosity of 1.53 (as measured in tetralin at 135° C.) were added 2% by weight of nickel 12-oxyoctadecanoate to prepare mixed powder A, and 2% by weight of zinc 12-oxyoctadecanoate to prepare mixed powder B. To mixed powders A and B were further added 0.3% by weight of 9 kinds of zinc phosphates described in Table 13, separately. The 18 mixtures were shaped into films of 0.1 mm. thickness by using a hot press heated to 230° C. These films were made objects of dyeing.

(b) Dyeing and dyed matters.—The aforesaid films were dyed with the following dye. Chromaticity calculated from the tristimulus values after soaping were shown in Table 13.

Dyeing conditions.—Dye: 6-(2'-oxy-5-chlorophenylazo)-3-diethylaminophenol.

Concentration (OWF based on the weight of films) percent _____ 3
Temperature _____ ° C__ 96
Liquor ratio _____ 1:100
Period _____ minutes__ 60

TABLE 13.—CHROMATICITY (SATURATION) PERCENT

| Ex. | Phosphates used | Samples | |
|---|---|---|---|
| | | (A) Polypropylene added with nickel 12-oxyoctadecanoate | (B) Polypropylene added with zinc 12-oxyoctadecanoate |
| 66 | Equimolar mixture of mono- and di-ethyl phosphates. | 22.9 | 62.0 |
| 67 | Equimolar mixture of zinc mono- and di-propyl phosphates. | 31.7 | 65.0 |
| 68 | Equimolar mixture of zinc mono- and di-n-butyl phosphate. | 60.2 | 70.6 |
| 69 | Equimolar mixture of zinc mono- and di-octyl phosphate. | 64.2 | 75.5 |
| 70 | Equimolar mixture of zinc mono- and di-dodecyl phosphates. | 65.5 | 74.8 |
| 71 | Equimolar mixture of zinc mono- and di-octadecyl phosphates. | 61.2 | 70.1 |
| 72 | Equimolar mixture of zinc mono- and di-dococyl phosphates. | 50.7 | 68.7 |
| 73 | Equimolar mixture of zinc mono- and di-cyclohexyl phosphates. | 56.3 | 71.2 |
| 74 | Equimolar mixture of zinc mono- and di-1-methylpentyl phosphates. | 67.5 | 73.2 |
| Control | Non-addition of phosphates. | 20.0 | 62.1 |

Example 75

(a) Preparation of polypropylene compositions.—To powdered isotactic polypropylene having intrinsic viscosity of 1.53 (as measured in tetralin at 135° C.) were added 3% by weight of zinc octadecylamino propionate and 0.3% by weight of a cadmium salt of an equimolar mixture of di-n-octyl phosphate and mono-n-octyl phosphate. These were mixed by Henschel mixer, thereafter the mixture was melt-kneaded at 200° C. using an extruder according to the conventional method. The chips obtained by cutting to a constant length of 3–5 mm. the resultant strands were extruded through a spinneret having 24 orifices of 0.8 mm. diameter to make them non-stretched filaments and wound the same at a constant speed (600 m./min.).

A 100 D/24 fil yarn obtained by stretching 450% the non-stretched filaments with heat (heated plate) and another yarn prepared under exactly the same conditions but not containing 0.3% by weight of the cadmium salt of an equimolar mixture of mono- and di-n-octyl phosphates as a control were made objects of dyeing.

(b) Dyeing and dyed matters.—The ICI numbers calculated from the tristimulus values of the yarns dyed with the following dye were shown in Table 14.

As a result, apparently the chromaticity advanced and the color tone became brilliant in the polypropylene fiber containing the cadmium salt of the (equimolar) mixture of mono- and di-n-octyl phosphates.

Dyeing conditions.—Dye: 2-(2'-oxy-5'-chlorophenylazo)-5-diethylamino phenol.

Concentration of the dye: (OWF based on the matters to be dyed) _____ percent__ 4
Liquor ratio _____ 1:100
Dyeing temperature _____ ° C__ 96
Dyeing period _____ minutes__ 60

TABLE 14.—ICI NUMBERS

| Ex. | Samples | Color tone | Measured values | | | Color index | |
|---|---|---|---|---|---|---|---|
| | | | Main wave length (mμ) | Chromaticity (percent) | Brightness, Y | x | y |
| 75 | Polypropylene containing zinc octadecylamino propionate and cadmium mono- and di-n-octyl phosphates of this invention. | Brilliant scarlet red. | 634 | 72 | 12.1 | 0.6039 | 0.2976 |
| Control | Polypropylene containing zinc octadecylamino propionate only. | Dark scarlet | 628 | 65 | 12.0 | 0.575 | 0.304 |

Example 76

When the yarn of Example 75 and the control yarn described in Example 75 were dyed with a dye of the following formula under the same conditions as in Example 75, ICI numbers as shown in Table 15 were obtained from the tristimulus values, and in the yarn according to this invention, chromaticity advanced remarkably.

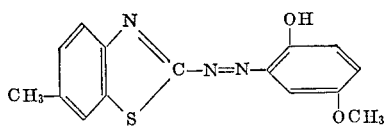

These were co-melted and kneaded inside an extruder heated to 202° C. and the extruded strand was cut into a constant length of 3 mm. The chips thus obtained were re-heated to 240° C. and extruded through a spinneret having 24 orifices of 0.8 mm. diameter according to the conventional method. The extruded filaments were stretched 420% under heat (using as heated pin) and a yarn A was obtained.

To the aforesaid composition was further added 0.5% by weight of nickel mono- and di-2-ethylhexyl phosphates, from the mixture of which a yarn B was prepared by spinning and stretching under exactly the same conditions as above. The aforesaid yarns A and B were dyed with dyes of the following formula, respectively, thereafter the dyed yarns were irradiated by a Fade-ometer. The results of light fastness test (represented by the time when discoloration began) were shown in Table 16.

TABLE 15.—ICI NUMBERS

| Ex. | Samples | Color tone | Measured values ||| Color index ||
|---|---|---|---|---|---|---|---|
| | | | Main wave length (mµ) | Chromaticity (percent) | Brightness, Y | x | y |
| 76 | Polypropylene containing zinc octadecylamino propionate and cadmium mono- and di-n-octyl phosphates of this invention. | Brilliant green | 494.3 | 38.2 | 11.7 | 0.226 | 0.333 |
| Control | Polypropylene containing zinc octadecylamino propionate only. | Dark green | 496.2 | 19.7 | 11.3 | 0.288 | 0.341 |

Example 77

To powdered isotactic polypropylene having intrinsic viscosity of 1.53 (as measured in tetralin at 135° C.) were added 3% by weight of zinc octadecylamino-1-methyl propionate and as a stabilizer 0.2% by weight of 1,1,3 - tri - (2'-methyl-4'-oxy-5'-tert-butylphenyl) butane.

TABLE 16.—DEGREE OF FASTNESS TO LIGHT (TIMES WHEN DISCOLORATION BEGAN)

| Dye 3% OWF | Example ||
|---|---|---|
| | Control | 77 |
| | Samples ||
| | Yarn (A) | Yarn (B)–Yarn (A) added further with nickel 2-ethylhexyl phosphates according to this invention |
| 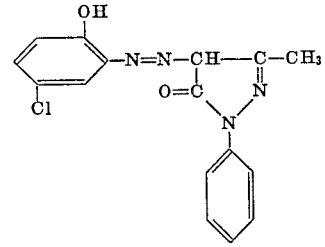 | 5 hr | 20 hr., brilliant yellow. |
| 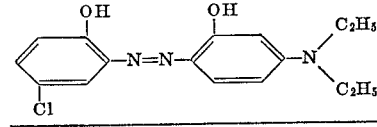 | 20 hr | 80 hr., scarlet red. |
| 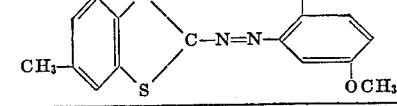 | 20 hr | 80 hr., brilliant greenish blue. |
| 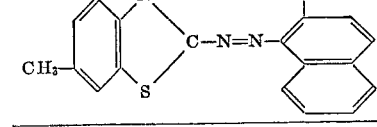 | 40 hr | 80 hr., bluish green. |
| 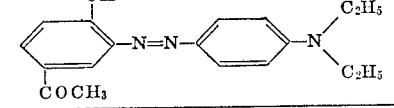 | 10 hr | 20 hr., scarlet. |

Example 78

The yarns A and B in Example 77 were heated dry and wet to various temperatures. The change of degree of exhaustion of the dye bath to the following dye at that occasion was shown in Table 17.

In the yarn B having been added with nickel 2-ethylhexyl phosphate, apparently effects of preventing lowering of degree of dyeing power were observed.

Dyeing conditions.—Dye:

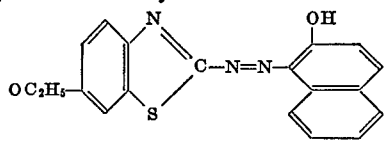

| Liquor ratio | 1:100 |
|---|---|
| Temperature °C | 98 |
| Period minutes | 60 |
| Concentration of the dye percent OWF | 3 |

TABLE 17.—DEGREE OF EXHAUSTION OF THE DYE BATH (PERCENT)

| | Example | |
|---|---|---|
| | Control | 78 |
| Item | | Sample |
| | (A) | (B) of this invention, i.e. (A) added further with nickel 2-ethylhexyl phosphate |
| Original yarn | 76 | 79 |
| After subjected to dry heating at 120° C. for 30 min | 64 | 76 |
| After subjected to dry heating at 130° C. for 30 min | 32 | 73 |
| After subjected to dry heating at 140° C. for 30 min | 24 | 71 |
| After subjected to wet heating at 120° C. for 30 min | 21 | 69 |

Example 79

To powdered isotactic polypropylene having intrinsic viscosity of 1.35 (as measured in tetralin at 135° C.) were added 3% by weight of zinc octylamino-2-methyl propionate, 0.2% by weight of 2.6-di-tert butylphenol as an antioxidant, and 0.3% by weight of dibutyl tin maleate laurate. These were mixed by a V-shaped blender, thereafter the mixture was melted at 205° C. and pelletized as in Example 75. After that, the pellets were re-melted at 210° C., spun and stretched and a white transparent yarn A was obtained.

Next, the powder composition mixed by the aforesaid V-shaped blender was further added with 0.3% by weight of nickel 2-methylpentyl phosphate according to this invention and a yarn B was spun by spinning and stretching under exactly the same method as above.

After these yarns were dyed with dyes of the formulae described in Table 18, the times when discoloration began due to irradiation by a Fade-ometer were shown as follows:

TABLE 18.—DEGREES OF FASTNESS TO LIGHT (TIMES WHEN DISCOLORATION BEGAN)

| | Example | |
|---|---|---|
| | Control | 77 |
| | Samples | |
| Dyes | Yarn (A) (hr.) | Yarn (B)—Yarn (A) added further with nickel 2-methylpentyl phosphate according to this invention (hr.) |
| [dye structure with OCH₃, Cl, N=N-CH-C-CH₃] | 5 | 20 |
| [dye structure with Cl, OH, OH, N(C₂H₅)₂] | 10 | 40 |
| [dye structure with OC₂H₅, N, S, C-N=N, OH] | 20 | 80 |

TABLE 18.—Continued

| Dyes | Example | |
|---|---|---|
| | Control | 77 |
| | Samples | |
| | Yarn (A) (hr.) | Yarn (B)–Yarn (A) added further with nickel 2-methylpentyl phosphate according to this invention (hr.) |
| 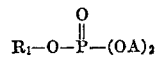 | 20 | 160 |
| 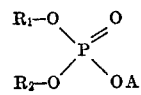 | 20 | 80 |

Example 80

When cadmium octylamino-2-methyl propionate was used instead of zinc octylamino-2-methyl propionate in Example 79, nickel 2-methylpentyl phosphate was observed to have effects of remarkably advancing the degree of fastness to light.

Example 81

To powdered polyethylene produced by low-pressure method having intrinsic viscosity of 1.72 (as measured in tetralin at 135° C.) were added 2.5% by weight of zinc dodecylamino-1-methyl propionate and 0.5% by weight of nickel cyclohexyloctyl phosphate. The mixture was melt-spun and stretched. When the obtained yarn was heated under various conditions and then dyed, no lowering of degree of dyeing power was observed.

By contrast, in the case of a control yarn obtained by preliminarily excluding nickel cyclohexyloctyl phosphate from the aforesaid composition, remarkable lowering of degree of dyeing power was observed as a result of dry/wet heating.

These results were shown in Table 19. The numbers in Table 19 show degrees of exhaustion of (dye of) the dye bath (percent).

Dyeing conditions.—Dye:

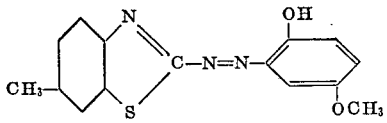

Liquor ratio _____ 1:100
Temperature _____ ° C__ 98
Period _____ minutes__ 60
Concentration _____ percent OWF__ 3

TABLE 19.—DEGREE OF EXHAUSTION OF THE DYE BATH (PERCENT)

| Items | Example | |
|---|---|---|
| | Control | 81 |
| | Sample | |
| | Yarn containing zinc dodecyl-amino-1 pro-pionate only | Yarn added with nickel cyclo-hexyloctyl phosphate according to this invention |
| Original yarn | 82 | 81 |
| After subjected to dry heating at 110° C. for 30 min | 59 | 72 |
| After subjected to dry heating at 120° C. for 30 min | 18 | 68 |
| After subjected to wet heating at 110° C | 25 | 65 |

Example 82

When nickel laurylisobutyl phosphate was used instead of nickel cyclohexyloctyl phosphate in Example 81, the similar effects were obtained.

What is claimed is:

1. A shaped polyolefin article having improved dyeability, said article comprising a polyolefin containing:
   (1) at least one organic metal salt of (a) a metal selected from the group consisting of metals of Groups I–$b$, II–$b$, IV–$b$, and VIII of the fourth period of the Periodic Table, and (b) a carboxyl radical-containing compound, and
   (2) at least one phosphoric acid ester selected from the formulae:

$$R_1-O-\overset{\overset{O}{\|}}{P}-(OA)_2$$

and $$\begin{array}{c} R_1-O \\ R_2-O \end{array} \overset{O}{\underset{\diagdown OA}{P}}$$

wherein $R_1$ and $R_2$ are selected from the group consisting of saturated and unsaturated alkyl, aryl, alkylaryl, arylalkyl, and cycloalkyl radicals; and A is an atom selected from hydrogen, aluminum, and metals of Group VIII of the fourth period and Group II of the Periodic Table.

2. The shaped article of claim 1 wherein said polyolefin is polypropylene.

3. The shaped article of claim 1 wherein said carboxyl radical-containing compound is a compound selected from the group consisting of carboxylic acids, oxy-carboxylic acids, and amino carboxylic acids.

4. The shaped article of claim 3 wherein said carboxyl radical-containing compound is a monocarboxylic acid.

5. The shaped article of claim 4 wherein said monocarboxylic acid has not less than 8 carbon atoms.

6. The shaped article of claim 4 wherein said carboxylic acid is selected from aliphatic and alicyclic carboxylic acids having 8–22 carbon atoms.

7. The shaped article of claim 1 wherein at least one metal component of said organic metal salt is a metal selected from the group consisting of zinc, cadmium, copper, tin, nickel, cobalt, and iron.

8. The shaped article of claim 1 wherein said organic metal salt is added to said polyolefin in an amount of 0.05–2% by weight.

9. The shaped article of claim 1 wherein the alkyl, aryl, alkylaryl, arylalkyl, and cycloalkyl radicals of said phosphoric acid ester have 4–22 carbon atoms.

10. The shaped article of claim 9 wherein said phosphoric acid ester has an aliphatic alkyl radical having 4–12 carbon atoms.

11. The shaped article of claim 1 wherein A is zinc.

12. The shaped article of claim 1 wherein A is nickel.

13. The shaped article of claim 1 wherein said phosphoric acid ester is added to said polyolefin in an amount of 0.05–5% by weight.

14. The shaped article of claim 13 wherein said phosphoric acid ester is added to said polyolefin in an amount of 0.1–3% by weight.

References Cited

UNITED STATES PATENTS

| | | |
|---|---|---|
| 3,099,515 | 7/1963 | Goodings et al. |
| 3,112,159 | 11/1963 | Cappuccio et al. |
| 3,296,239 | 1/1967 | Elizabeth et al. |

JOSEPH L. SCHOFER, *Primary Examiner.*

L. EDELMAN, *Assistant Examiner.*